(12) United States Patent
Barsoum et al.

(10) Patent No.: US 7,114,764 B1
(45) Date of Patent: Oct. 3, 2006

(54) MINE AND COLLISION PROTECTION FOR PASSENGER VEHICLE

(75) Inventors: Roshdy George S. Barsoum, McLean, VA (US); Rodney O. Peterson, Frederick, MD (US); David P. Owen, Columbia, MD (US); Wayne C. Jones, Elkridge, MD (US); David E. Johnson, Severna Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 189 days.

(21) Appl. No.: 10/829,616

(22) Filed: Apr. 22, 2004

(51) Int. Cl.
*B60R 21/00* (2006.01)
*F41H 7/00* (2006.01)

(52) U.S. Cl. .......................... 296/193.07; 296/187.08; 89/36.08; 89/36.09

(58) Field of Classification Search ........... 296/193.07, 296/203.01, 204, 187.03, 187.08, 1.03, 1.04; 89/36.01, 36.07–36.09
See application file for complete search history.

(56) References Cited

U.S. PATENT DOCUMENTS

| | | | | |
|---|---|---|---|---|
| 4,061,815 A | * | 12/1977 | Poole, Jr. ..................... | 428/215 |
| 4,101,704 A | * | 7/1978 | Hiles .......................... | 428/218 |
| 4,198,454 A | * | 4/1980 | Norton ........................ | 428/117 |
| 4,348,446 A | * | 9/1982 | Mitsuishi et al. ............ | 428/148 |
| 4,404,889 A | * | 9/1983 | Miguel ........................ | 89/36.02 |
| 4,529,640 A | * | 7/1985 | Brown et al. ................ | 428/116 |
| 4,566,237 A | * | 1/1986 | Turner ......................... | 52/269 |
| 4,665,794 A | | 5/1987 | Gerber et al. | |
| 4,732,803 A | | 3/1988 | Smith, Jr. | |
| 4,738,893 A | | 4/1988 | Grillo | |
| 5,059,467 A | * | 10/1991 | Berkovitz .................... | 428/137 |
| 5,221,807 A | | 6/1993 | Vives | |
| 5,271,612 A | * | 12/1993 | Yada et al. .................. | 267/158 |
| 5,533,781 A | * | 7/1996 | Williams ..................... | 296/204 |
| 5,635,288 A | | 6/1997 | Park | |
| 5,635,562 A | * | 6/1997 | Malcolm ..................... | 525/108 |
| 5,663,520 A | * | 9/1997 | Ladika et al. ............... | 89/36.08 |
| 5,679,918 A | * | 10/1997 | Korpi et al. ................. | 89/36.08 |
| 5,705,764 A | | 1/1998 | Schade et al. | |

(Continued)

OTHER PUBLICATIONS

U.S. Appl. No. 60/564,584, filed Apr. 23, 2004, Invention entitled "Steel or Ceramic Armor Encapsulated or Sandwiched by a Polymer Having High Stress Hardening," inventors Roshdy George S. Barsoum and Phillip Dudt.

(Continued)

*Primary Examiner*—H. Gutman
(74) *Attorney, Agent, or Firm*—Howard Kaiser

(57) ABSTRACT

Many military land vehicles are not designed to withstand extreme forces concomitant exploding mines. A vehicle's capacity to protect its occupants is inventively enhanced by structurally augmenting the vehicle, in lower structural portions closely related to the vehicle's cabin, with both elastomeric and rigid (non-elastomeric) materials. An elastomeric layer and a rigid layer (typically embodied as a metal or composite sheet or plate) are added to the vehicle in each of seven locations, viz., the four wheel wells (left-front, right-front, left-rear, right-rear), the two floorboards (left and right), and the intervening underside area. At each wheel well and floorboard location, the elastomer is sandwiched between the vehicle's existing rigid structure and the rigid member so as to form a tri-layer material system. At the intervening underside location, an elastomer-coated rigid member is attached with the elastomer facedown. The seven material systems are energy-dissipative and impact-deflective both locally and globally.

25 Claims, 7 Drawing Sheets

U.S. PATENT DOCUMENTS

| | | | |
|---|---|---|---|
| 5,789,327 | A | 8/1998 | Rousseau |
| 5,792,974 | A | 8/1998 | Daqis et al. |
| 5,905,225 | A * | 5/1999 | Joynt .................. 89/36.02 |
| 6,213,540 | B1 * | 4/2001 | Tusim et al. ........... 296/187.02 |
| 6,298,963 | B1 | 10/2001 | Kim |
| 6,386,131 | B1 | 5/2002 | Barsoum |
| 6,510,777 | B1 | 1/2003 | Neal |
| 6,532,857 | B1 | 3/2003 | Shih et al. |
| 6,792,843 | B1 | 9/2004 | Mohr et al. |

OTHER PUBLICATIONS

U.S. nonprovisional U.S. Appl. No. 10/864,317, filed Jun. 10, 2004, Invention entitled "Armor Including a Strain Rate Hardening Elastomer," Inventors Roshdy George S. Barsoum and Phillip Dudt.

Amy Klamper, "Defense Seeks to Shift $190M to Improve Armor for Humvees," article dated Mar. 30, 2004, *Government Executive Magazine* website, www.govexec.com; article located at http://www.govexec.com/dallyfed/0304/032304cdpm2.htm, printer friendly version printed out (1 page) on Oct. 4, 2004 at http://www.govexec.com/story_page.cfm?articleid=28059&printerfriendlyVers=1&.

P.E. Cros, L. Rota, C.E. Cottenot, R. Schirrer and C. Fond, "Experimental and Numerical Analysis of the Impact Behaviour of Polycarbonate and Polyurethane Multilayer," *J. Phys. IV France* 10, pp. Pr9-671 to Pr9-676, 2000, EDP Sciences, Les Ulis, France.

P.E. Cros, L. Rota, C.E. Cottenot, R. Schirrer and C. Fond, "Experimental Study and Numerical Simulations of the Impact Behaviour of Polycarbonate and Polyurethane Multilayer," 6 pages, apparently printed in 2000 or later, unknown whether or when published.

William Palmer, "Division Engineers Aid in Bolstering Protection for Marines in Iraq," *Wavelengths Online*, published online on Jul. 21, 2004 at http://www.dt.navy.mi/wavelengths/archives/000095.html, one page printed out on Feb. 3, 2005.

William Palmer, "Division Engineers Aid in Bolstering Protection for Marines in Iraq," *Wavelengths* (An Employee Digest of Events and Information), Naval Sea Systems Command, Naval Surface Warfare Center, Carderock Division, Jul. 2004 issue, page 11 (incl. photograph).

Edward M. Kennedy, Brian Hart and Alma Hart, "Pentagon Still Failing to Protect the Troops," *The Boston Globe*, article dated Feb. 3, 2005, two pages (printer friendly version) printed out online at http://www.boston.com/news/globe/editorial_opinion/oped/articles/2005/02/03/pentagon_still_failing_to_protect_the_troops?mode=PE on Feb. 3, 2005.

Craig Gordon, "Unfit for Combat: Humvees Need Armor to Give Them a Fighting Chance," *Washington Bureau*, article dated Dec. 14, 2003, five pages printed out online at http://www.geocities.com/equipmentshop/hmmwv.htm on Mar. 15, 2004.

* cited by examiner

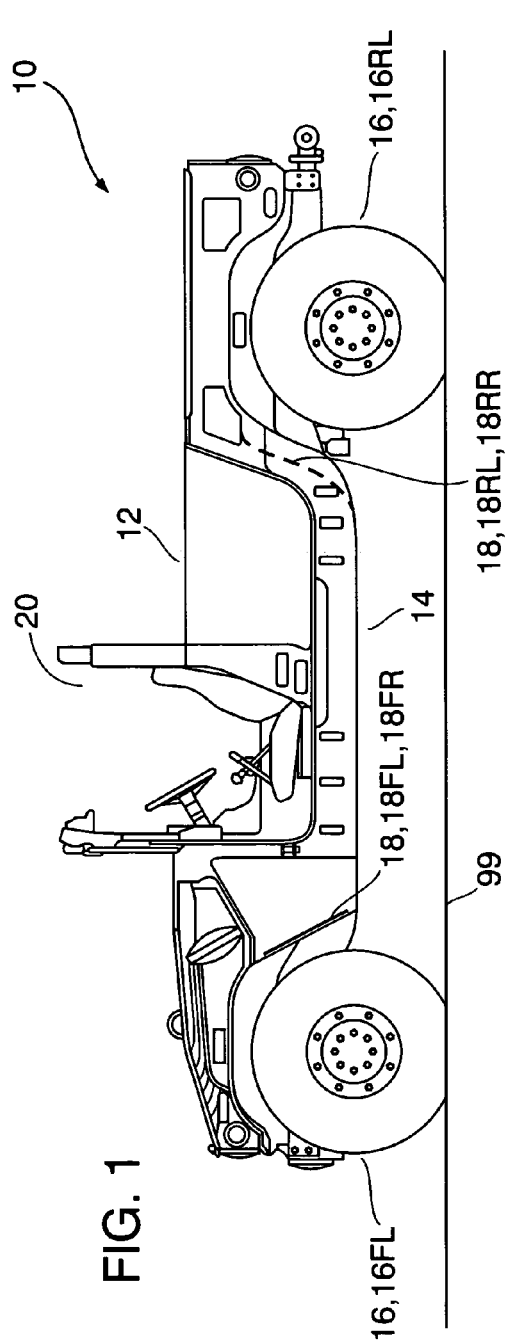
FIG. 1
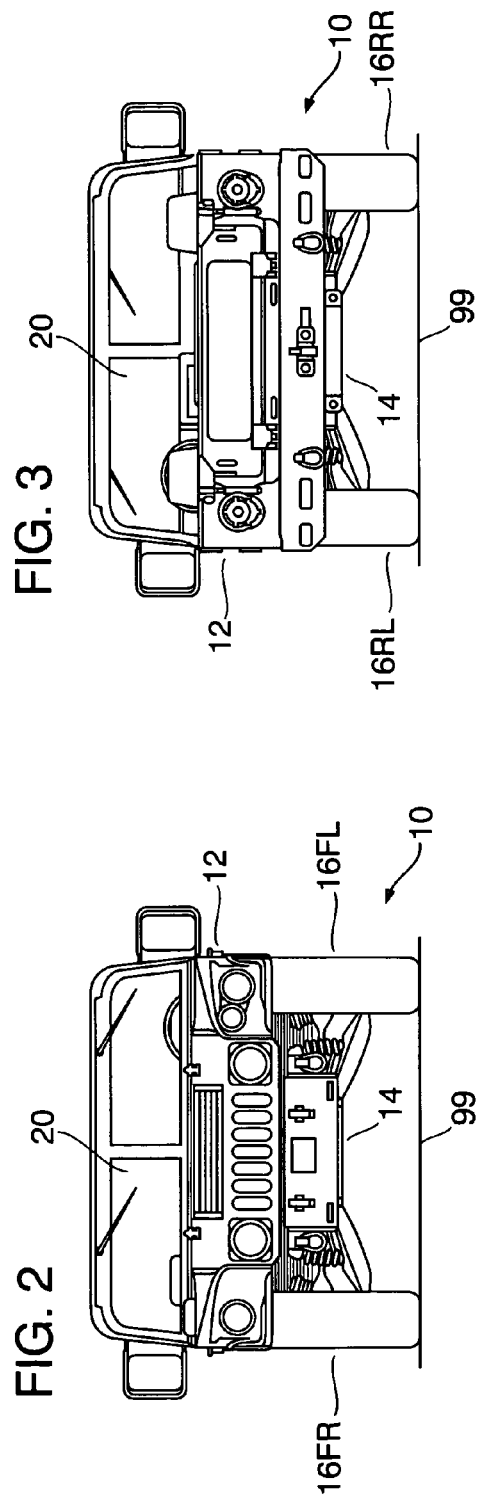
FIG. 2
FIG. 3

MINE AND COLLISION PROTECTION FOR PASSENGER VEHICLE

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to wheeled transportation vehicles, more particularly to methods and devices for protecting passengers of such vehicles from harm associated with deleterious events such as mine explosions and severe collisions.

It is desirable to protect passengers of a motor vehicle from death or serious bodily injury that they may incur when their motor vehicle encounters highly destructive forces such as associated with explosions and collisions. Passenger protection has been a concern for both military and commercial vehicles, the former being particular vulnerable when riding over land mines or otherwise being subjected to explosive forces.

Some current approaches for affording mine and/or crash protection are based on providing additional structural protection in the form of armor made of higher strength and hardened metals such as high hard steel. Further, the automotive industry is conducting crashworthiness tests for investigating various designs of bodies that can absorb energy through large plastic deformations. The use of metallic foams is also being explored by auto manufacturers in some of the "high-end" vehicles. To date, the passenger protection methodologies have proven to be excessive in terms of additional weight and/or additional expense.

AM General Corporation manufactures the "High Mobility Multipurpose Wheeled Vehicle" (abbreviated "HMMWV" and popularly referred to as "HUMVEE"®), a highly mobile four-wheel-drive U.S. military vehicle that provides a common light tactical vehicle capability. The HMMWV entered U.S. Army service in 1985, replacing the quarter-ton jeep and other vehicles. The HMMWV can be configured in a variety of vehicular modes, e.g., troop carrier, armament carrier, ambulance, scout vehicle, etc. Although the HMMWV military vehicles serve their missions well, they are notoriously vulnerable to enemy attack, particularly those implementing land mines and other explosive capabilities.

SUMMARY OF THE INVENTION

In view of the foregoing, it is an object of the present invention to provide an improved methodology for structurally enhancing wheeled vehicles for protecting passengers from death or serious bodily injury when the vehicles encounter explosive and/or mechanical impacts.

Other objects of the present invention are to provide such a methodology that is characterized by lower weight and lower cost as compared with conventional methodologies for accomplishing similar types of protection through structural enhancement.

The present invention represents a lighter, more affordable, more effective way of developing the needed force protection for wheeled vehicles. The present invention was primarily motivated by the need to afford better mine and crash protection to military personnel when riding in susceptible vehicles such as high mobility multipurpose wheeled vehicles (HMMWVs). Typically, inventive practice is not directed at preventing damage to the vehicle; indeed, under usual destructive circumstances a vehicle will incur significant damage, frequently beyond repair, despite inventive practice. Rather, what is normally the primary purpose of the present invention is to protect the occupant or occupants of the vehicle.

Typical inventive method embodiments are for rendering a vehicular cabin assembly more occupant-protective. The cabin assembly includes a cabin body, four wheel-facing bulkheads and two floorboards separated by a space therebetween. Each bulkhead adjoins a floorboard. The inventive method comprises providing shielding means for the cabin body, the providing shielding means including: (a) at each bulkhead, establishing a sandwich construction that includes the bulkhead, elastomeric material, and non-elastomeric material, wherein the elastomeric material is sandwiched between the bulkhead and the non-elastomeric material; (b) at each floorboard, establishing a sandwich construction that includes the floorboard, elastomeric material, and non-elastomeric material, wherein the elastomeric material is sandwiched between the floorboard and the non-elastomeric material; and, (c) at least substantially covering the space between the floorboards, the at least substantially covering including attaching to the cabin assembly a double-layer construction that includes elastomeric material and non-elastomeric material, wherein the elastomeric material is underneath the non-elastomeric material.

According to typical inventive vehicular embodiments, the inventively enhanced wheeled vehicle is a vehicle that is attributed with occupant protectiveness against injurious force encountered by the vehicle. The inventively enhanced vehicle comprises a cabin body, a cabin underside, two pairs of axial wheels, and two pairs of wheel well areas. The cabin underside includes two side floorboard areas and a non-floorboard area intermediate the floorboard areas. Each wheel well area is associated with a wheel. The floorboard areas and the wheel well areas are each characterized by a laminar configuration that includes two rigid layers and an elastomeric layer therebetween. The non-floorboard area is characterized by a laminar configuration that includes a rigid layer and an elastomeric layer wherein the elastomeric layer faces downward.

According to usual practice of an inventively enhanced vehicle, the floorboard areas, the non-floorboard area and the wheel well areas collectively form a buffer for the cabin. The buffer generally describes a dish shape. The inventively-enhanced vehicle has a front end and a rear end. Each floorboard area adjoins a front wheel well area and a rear wheel well area; the floorboard area, the front wheel well area and the rear wheel well area, in combination, generally describe a bracket shape. The non-floorboard area adjoins the floorboard areas; the non-floorboard area and the adjoining floorboard areas, in combination, generally describe a planar shape. In response to injurious force encountered by the vehicle, the buffer acts to deflect the impact and to dissipate the energy that are associated with the injurious force.

The inventive principles are applicable to multifarious types, sizes and styles of wheeled vehicles. In furtherance of affording this kind of protection, the present invention features the incorporation of elastomeric material and rigid (metallic or non-metallic, e.g., composite) material at strategic locations on the lower part of the vehicle. The present invention focuses upon two general areas, viz., the wheel well areas of the vehicle's underbody, and the cabin structure area of the vehicle's undercarriage (i.e., the underside of the cabin frame).

More specifically, the main regions of interest according to typical inventive practice are as follows: (i) the generally vertical, frontward facing region of the front left ("driver's side") wheel well; (ii) the generally vertical, frontward facing region of the front right wheel well; (iii) the generally vertical, rearward facing region of the rear left wheel well; (iv) the generally vertical, rearward facing region of the rear right wheel well; (v) the left floorboard region of the portion of the undercarriage that corresponds to the cabin; (vi) the right floorboard region of the portion of the undercarriage that corresponds to the cabin; (vii) the central region of the portion of the undercarriage that corresponds to the cabin.

In every such region, the inventive add-on structure includes an elastomeric layer (such as that which is applied through molding, casting, spraying or bonding) and a non-elastomeric layer (such as a sheet or plate made of a metal or composite or other non-metal material). In the context of inventive practice, a non-elastomeric layer is also referred to herein as a "rigid" layer (or "stiff" layer), since a non-elastomeric layer is characterized by a degree of rigidity (or stiffness) so as to be more rigid (or stiff) than an elastomeric layer. In each of regions (i) through (iv), the elastomeric layer is sandwiched between the existing wheel well surface and the rigid layer (e.g., a metallic or composite plate). In each of regions (v) and (vi), the elastomeric layer is sandwiched between the bottom floorboard surface and the rigid layer (e.g., a thin sheet that is metallic or composite). In region (vii), the rigid layer (e.g., a metallic or composite plate) is attached (e.g., bolted or adhered) to the undercarriage's central region (which, in a typical motor vehicle, is largely open or discontinuous), and the elastomeric layer is disposed next to the rigid layer so that the elastomeric layer faces downward and is nearer to the ground that the rigid layer.

Typical practice provides for use of an elastomeric material that is highly elastic or highly viscoelastic, e.g., characterized by a strain-to-failure of at least 100%, more typically at least 300% to 400% or greater. The present inventors style their elastomeric layer (which contributes to the mine and crash protection of the passenger or passengers) an "explosion resistant coating," or "ERC." The ERC material can be practically any elastomer, polymeric or non-polymeric, such as polyurea (a mixture of polyurethane and urea), polyurethane, or rubber. According to typical inventive practice, the inventive ERC has high strain-rate dependence and hardening characteristics to provide shock wave interaction, energy absorption, and prevention of fracture penetration under extreme loads such as mine explosion. Inventive principles are also applicable for crashworthiness purposes to prevent structural damage and reduce acceleration effects on the vehicle's occupants. Regardless of the source of the extreme loading, inventive practice succeeds in avoiding or minimizing injury and fatality.

The present invention's layered configuration provides protection against blasts and collisions at significantly lower weight and cost than does the existing technology. Because of the reduced weight associated with the inventive elastomer (ERC), the present invention's double-layered combination (one elastomeric layer, one non-elastomeric layer) can be added to a military vehicle without changing the mission capability of the vehicle. Further, the ERC can be applied via casting in place, spraying, or bonding a separate cured piece of elastomer. Because of the varied techniques and procedures at the practitioner's disposal for installation of the ERC, the ERC can be added to areas of vehicles that do not lend themselves to addition of other types of protective materials.

Although the present invention is of considerable value when involving "retrofitting" of the inventive enhancements with respect to an existing vehicle, the present invention can also be practiced to great effect in the context of vehicle manufacture so that the original vehicles leave the factory with inventive enhancements.

Other objects, advantages and features of the present invention will become apparent from the following detailed description of the invention when considered in conjunction with the accompanying drawings.

BRIEF DESCRIPTION OF THE DRAWINGS

FIG. 1 through FIG. 4 are driver side elevation, front elevation, rear elevation and underside plan views, respectively, of a high mobility multipurpose wheeled vehicle (HMMWV) that has not been enhanced in accordance with the present invention. FIG. 4 also reveals some interior detail.

DETAILED DESCRIPTION OF THE INVENTION

Figure 4:
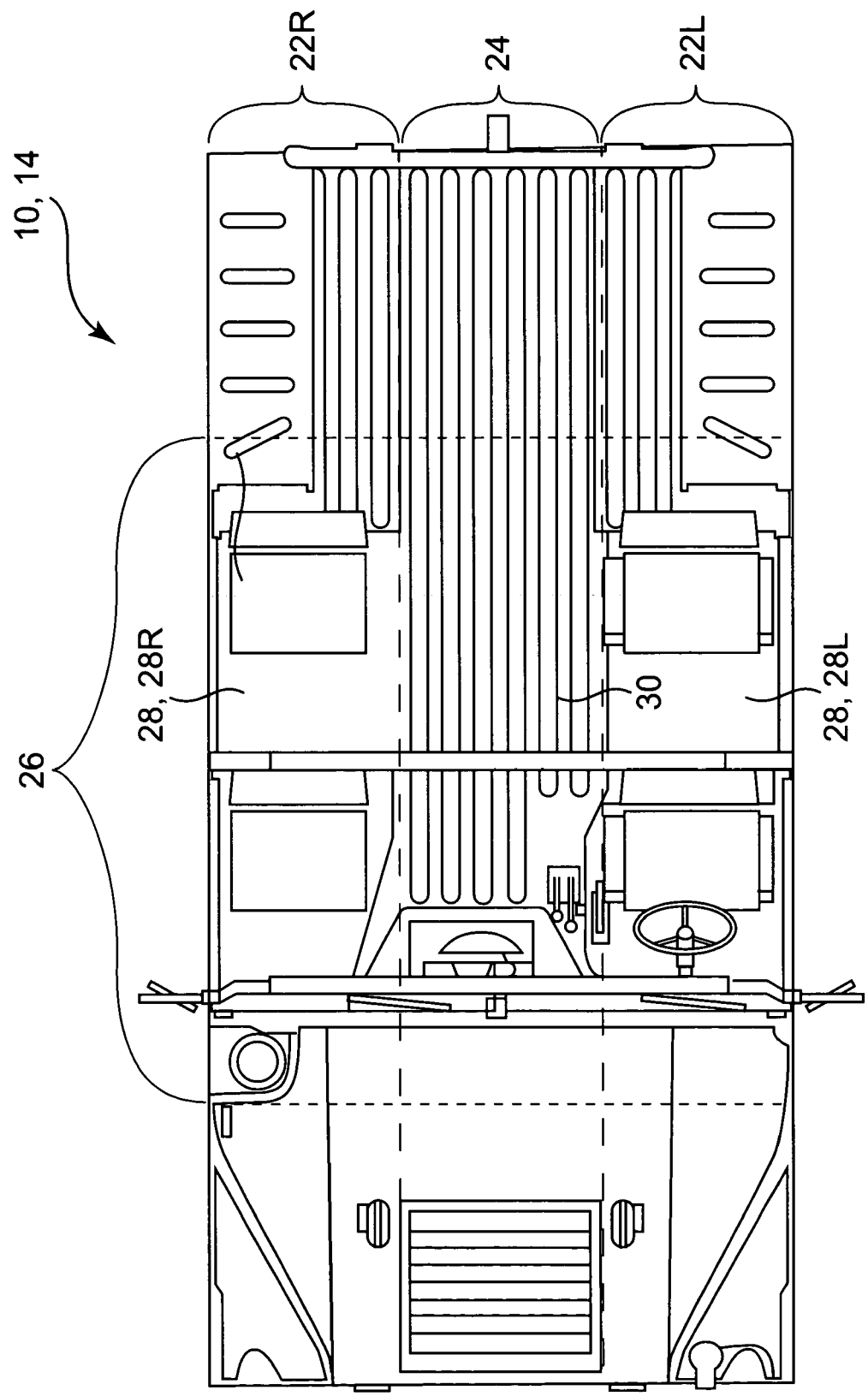
Figure 5:
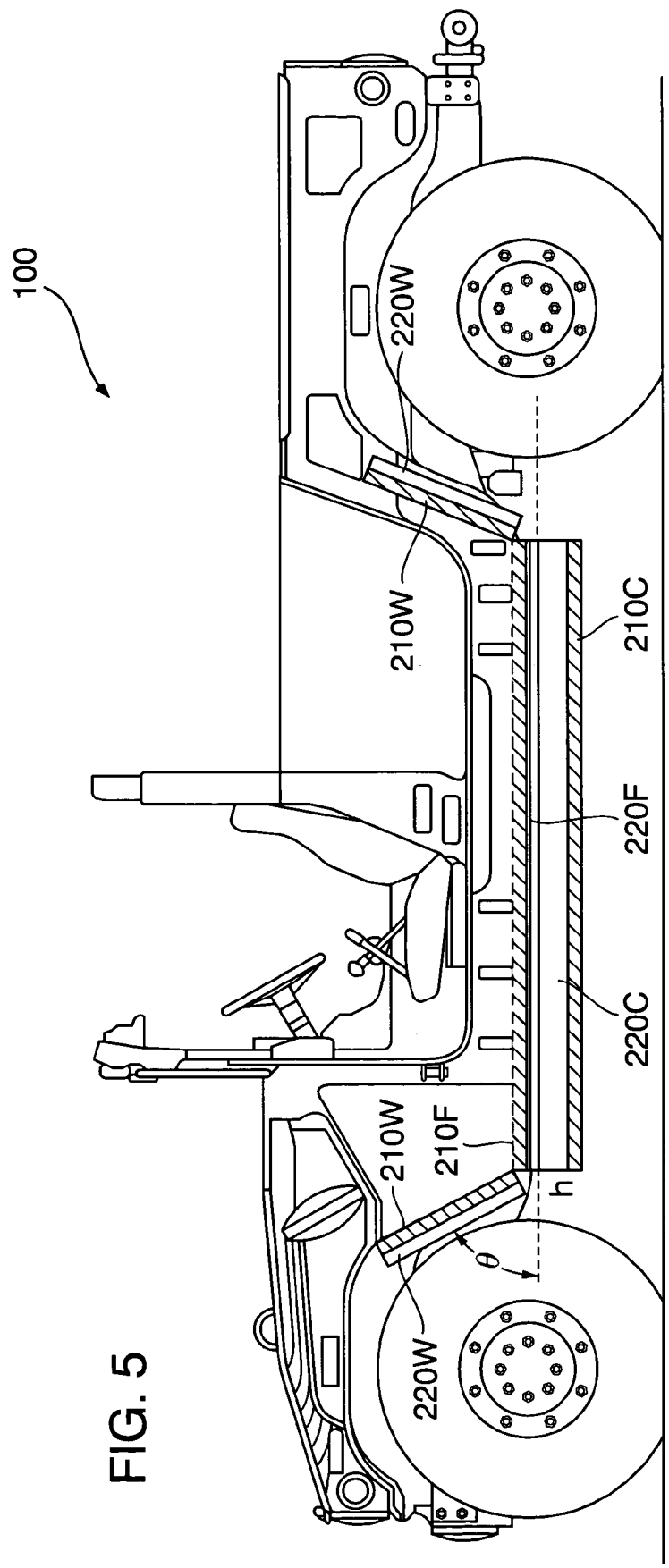
FIG. 5 is a driver side elevation view similar to the view shown in FIG. 1, wherein the vehicle shown in FIG. 1 through FIG. 4 has been protectively enhanced by elastomeric and non-elastomeric materials in accordance with the present invention.
Figure 6:
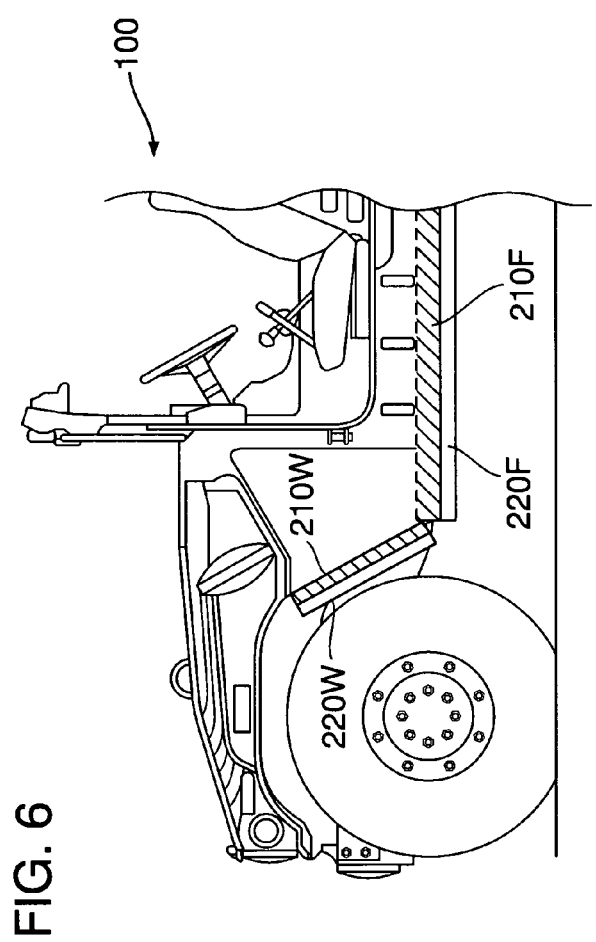
FIG. 6 is a partial driver side elevation view representing the front half of the inventively enhanced vehicle shown in FIG. 5, particularly illustrating the layered construction (adjacent elastomeric and non-elastomeric layers) that is inventively applied to each of the two lateral cabin underside areas of the vehicle.
Figure 7:
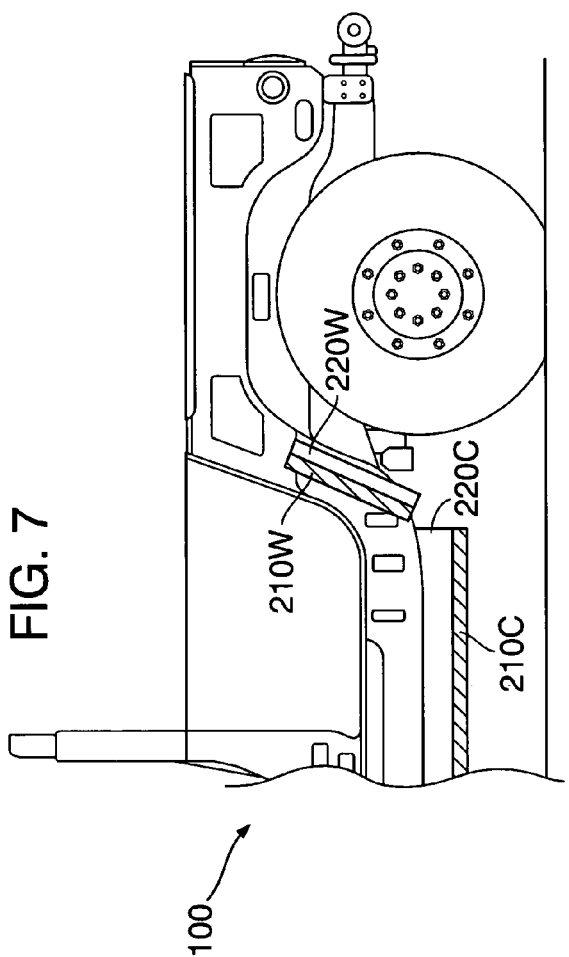
FIG. 7 is a partial driver side elevation view representing the front half of the inventively enhanced vehicle shown in FIG. 5, particularly illustrating the layered construction (adjacent non-elastomeric and elastomeric layers) that is inventively applied to the central cabin underside area of the vehicle.
Figure 9:
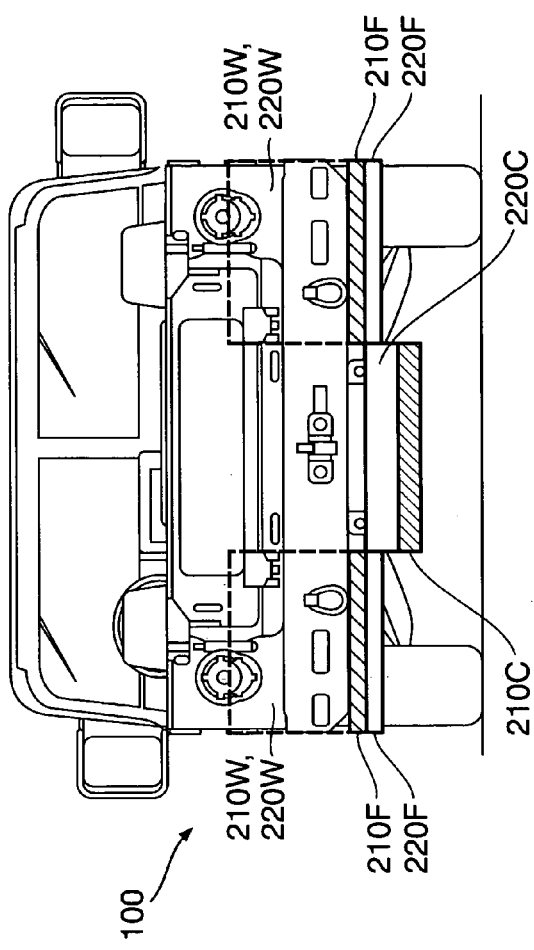
FIG. 9 is a rear elevation view of the inventively enhanced vehicle shown in FIG. 5.
Figure 8:
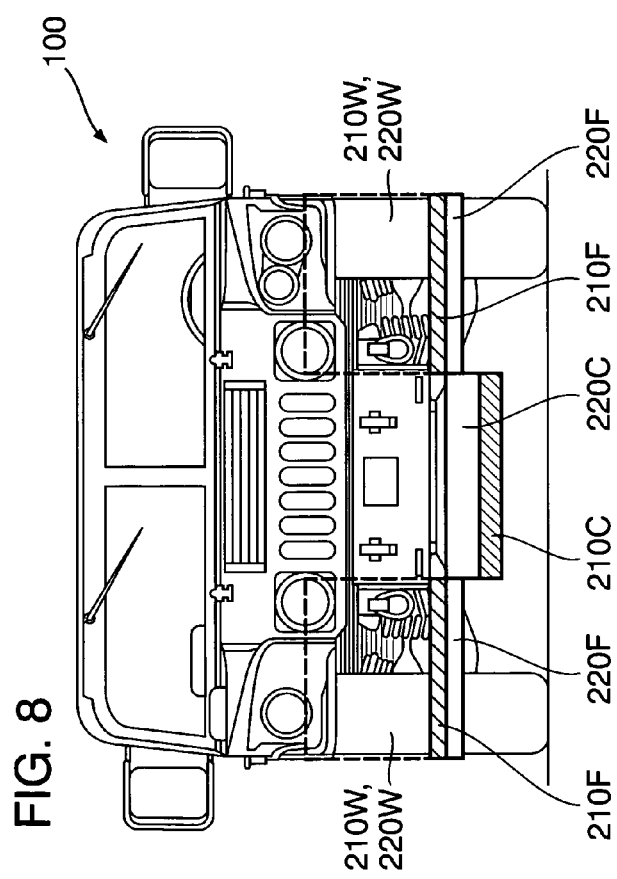
FIG. 8 is a front elevation view of the inventively enhanced vehicle shown in FIG. 5.
Figure 10:
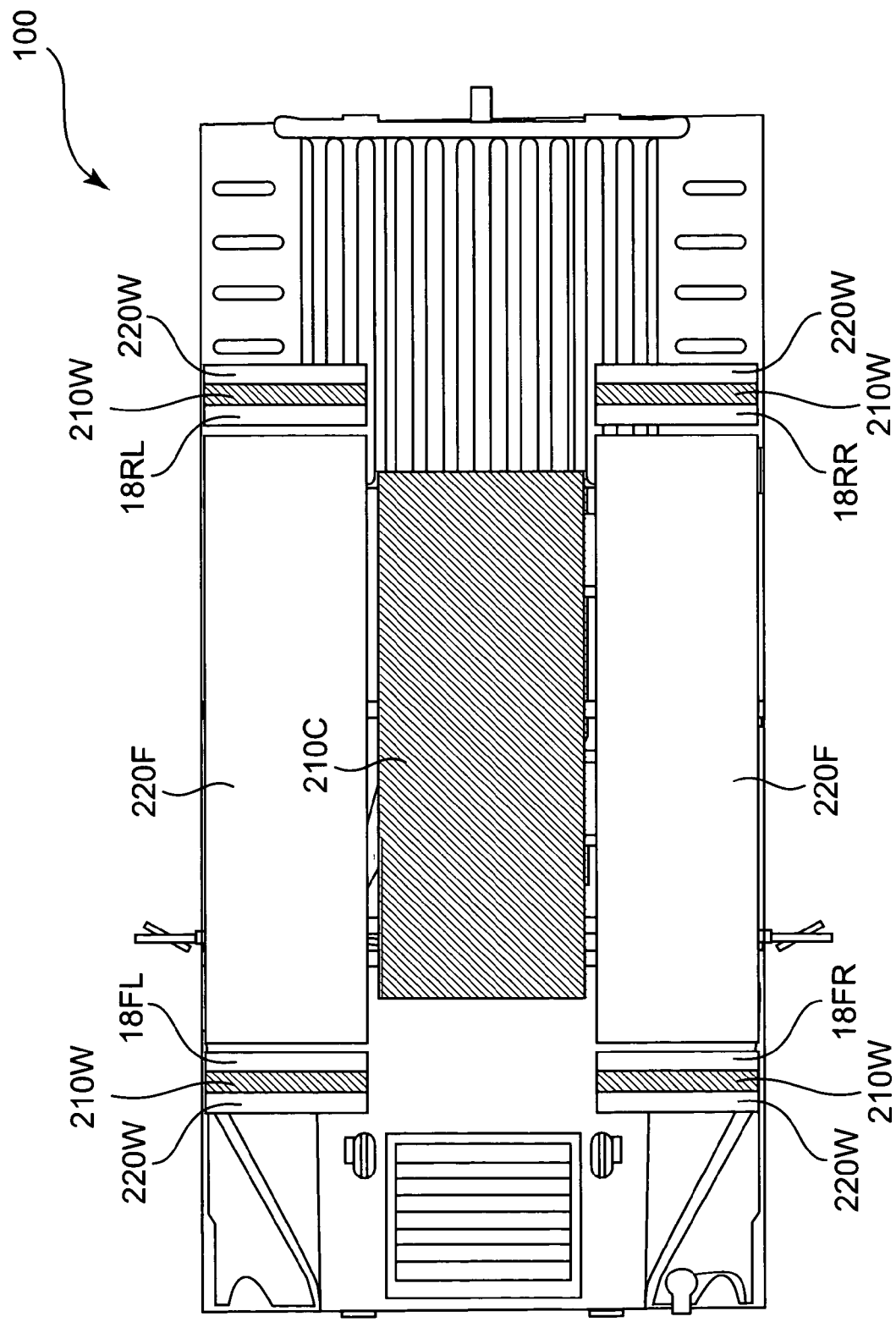
FIG. 10 is a bottom plan view of the inventively enhanced vehicle shown in FIG. 5.

Referring now to FIG. 1 through FIG. 4, high mobility multipurpose wheeled vehicle (HMMWV) 10 is a typical military passenger vehicle that is suitable for protective amplification in accordance with the present invention. The HMMWV 10 shown in FIG. 1 through FIG. 4 is a standard such vehicle that is not inventively enhanced. Vehicle 10 includes a body 12, an undercarriage 14, four wheels (tires) 16, and four wheel wells 18. Body 12 and undercarriage 14 are distanced above ground 99 by the wheels 16 and their associated axles.

Front left wheel 16FL and front right wheel 16FR share the front axle; rear left wheel 16FL and rear right wheel 16RR share the rear axle. Each wheel well 18 corresponds to a wheel 16. That is, front left wheel well 18FL is adjacent wheel 16FL; front right wheel well 18FR is adjacent wheel 16FR; rear left wheel well 18RL is adjacent wheel 16RL; rear right wheel well 18RR is adjacent wheel 16RR. Each wheel well 18 is a wall-like or bulkhead-like structure that is designed to shield interior parts of vehicle 10 from objects such as flying debris occasioned by rotation of the corresponding wheel 16.

Body 12 includes a cabin 20 for housing one or more passengers. The term "passenger" as used herein is synonymous with "occupant" or "traveler," referring to any person that is conveyed by the vehicle regardless of whether or not the person participates in the operation of the vehicle. Undercarriage 14 is divisible into three "longitudinal" sections, each extending from front to rear of vehicle 10, viz., a lefthand (driver's side) lateral longitudinal section 22L, a righthand lateral longitudinal section 22R, and a medial longitudinal section 24. Undercarriage 14 includes a cabin underside 26, which is that portion of undercarriage 14 situated at the bottom of or directly beneath cabin 20.

Cabin underside 26 includes three longitudinal regions, each longitudinal region being included as part of a longitudinal section, viz., a left floorboard region 28L (which left longitudinal section 22L includes), a right floorboard region 28R (which right longitudinal section 22R includes), and a central region 30 (which medial longitudinal section 24 includes). Floorboard regions 28L and 28R are continuous flat structures that represent the foundations for the passenger spaces. Situated intermediate floorboard regions 28L and 28R, central region 30 is the substantially open or discontinuous structure that represents the foundation for the components (e.g., drive line, exhaust system, fuel tank) contained in a longitudinal-axial "hump"-shaped compartment located between the lefthand and righthand passenger spaces.

Reference now being made to FIG. 5 through FIG. 11, standard HMMWV 10 is inventively enhanced so as to become explosion/collision-protective HMMWV 100. In accordance with the present invention, blast and collision protection is provided though the selective add-on use of a two-layer laminar combination that includes an elastomeric layer 210 (also referred to herein as an "ERC coating") and a non-elastomeric layer 220 (also referred to herein as a "rigid" or "stiff" layer). The thicknesses of layers 210 and 220 are exaggerated for illustrative purposes in FIG. 5 through FIG. 11.

In the wheel well regions 18 and the floorboard regions 28, an inventive laminar system 200 is formed so that an elastomeric layer 210 is sandwiched between an existing structural portion of vehicle 100 (a wheel well 18 or a floorboard 28, as the case may be) and a non-elastomeric (rigid) layer 220 such as a sheet metal mold material or a metal plate mold material. In the central region 30, an inventive two-layer combination is joined to vehicle 100 so that a rigid layer 220 is attached to undercarriage 14 and an elastomeric layer 210 is disposed on the opposite side of the rigid layer 220 so that the elastomeric layer faces downward toward ground 99.

Hence, a three-layer sandwich construction, laminar material system 200W, is created in each of the four wheel well 18 regions; further, a three-layer sandwich construction, laminar material system 200F, is created in each of the two floorboard 28 regions. In each three-layer material system 200W or 200F, an elastomeric material is sandwiched between two rigid materials; that is, an elastomeric layer 210 is sandwiched between an existing rigid structural portion of vehicle 10 and a rigid layer 220.

In contrast, laminar material system 200C is a two-layer sandwich construction, not a three-layer sandwich construction. A two-layer material system 200C is associated with the central region 30 wherein a rigid material 220C coated with an elastomeric material 210C is mounted below the substantially open centric area 30 of the vehicular underside; that is, a rigid layer 220 that is covered with an elastomeric layer 210 on the rigid layer's downward facing side is adjacent on the rigid layer's upward facing side to what largely constitutes a void in undercarriage 14.

Depending upon the perceived threats to vehicle 10 and the locations of inventive structural association with respect to vehicle 10, the rigid layer 220 will typically vary in the range between about 0.03 inches in thickness (e.g., sheet metal) and about 0.25 inches in thickness (e.g., mild steel). Regardless of the placement of an inventive rigid-elastomeric combination with respect to unenhanced vehicle 10, elastomeric layer 210 and rigid layer 220 are coupled so that rigid layer 220 is next to elastomeric layer 210. A variety of techniques are available to the inventive practitioner for covering rigid layer 220 with elastomeric layer 210; for instance, elastomeric layer 210 can be castable or moldable wherein rigid layer 220 is the mold material. Alternatively, elastomeric layer 210 can be sprayed upon rigid layer 220. As another option, a whole elastomeric layer 210 (an integral piece) can be bonded to rigid layer 220.

As shown in FIG. 5 through FIG. 9, a rigid member (e.g., steel plate) 220W is mounted on each wheel well 18 so that an elastomeric material 210W is situated therebetween, thus forming a three-layer elastomeric-sandwich construction 200W. In the event of a mine explosion, steel "deflector" plate 220W deflects the initial high impulsive loading of the explosion away from the driver and other occupant(s) of inventively enhanced vehicle 100. The steel deflector plate 220W and at least a portion of the aluminum wheel well 18 structure sandwich elastomer (e.g., polyurea) 210W so as to impart confinement to the polyurea 210W. The contour of front well 16FL is visible to the observer, whereas that of rear wheel well 16RL is hidden from view by the fender structure of vehicle 100. As distinguished from the rectilinear front wheel wells 16FL and 16FR, the rear wheel wells 16RL and 16RR are depicted as being characterized by a degree of curvilinearity. Each plate 220W is conformingly coupled with a substantially flat and nearly vertical portion of the corresponding front or back wheel well 16.

Two defeat mechanisms are manifested at wheel wells 18 upon the occurrence of an explosion. As a general statement in materials science and engineering, an elastomer in a confined state will have orders of magnitude higher modulus and dynamic properties than will the same elastomer in an unconfined state. At wheel wells 18, the sandwich construction (wherein an elastomer 210 is interposed between a stiff wheel well 18 and a stiff layer 220) results in the generation of internal shock waves that dissipate the high impulse loading. Further, at wheel wells 18, this sandwich construction provides a mechanism known as "constrained layer damping" so as to dissipate a very wide range of frequencies, after the initial shock loading.

The two abovementioned impact-thwarting mechanisms are also taken advantage of in the floorboard regions 28. A rigid member (e.g., thin sheet metal or composite sheet) 220F is mounted on each floorboard 28 so that an elastomeric material 210F is situated therebetween, thus forming a three-layer elastomeric-sandwich construction 200F. That is, on each of the lefthand and righthand sides and under both the front and back seats, the elastomer 210F is sandwiched between the sheet metal 220F and at least a portion of the floorboard 18F. There are two notable distinctions between sandwich construction 200F and sandwich construction 200W, these distinctions being associated with the difference in thicknesses between rigid layer 200W and rigid layer 200F.

In this regard, as distinguished from three-layer material system 200W, additional impact-thwarting mechanisms are present in the case of three-layer material system 200F. The casting of the elastomer 210F onto and underneath the floors (floorboards) 28 helps to protect cabin 20, especially the cargo areas. When a frontal explosion occurs, three-layer material system 200F reduces the vibrations of cabin 20, thereby further reducing the impact acceleration ("g-forces") on the passengers. In the case of a vehicular rear explosion, by means of a momentum-trapping mechanism, three-layer material system 200F prevents penetration of the cargo areas of the floors (floorboards) 28.

According to typical inventive practice, at each floorboard 28 the rigid member 220F is made of a thin material such as sheet metal or composite sheet. Since a thin rigid sheet 220F lacks the stiffness of a thicker deflector plate 220W, the sandwich construction 200F resists the explosion through shock reflections and prevents fracture and localization. The relative thinness of rigid layer 220F thus gives rise to another defeat mechanism. Furthermore, the thin quality of rigid layer 220F more naturally lends itself to a fabrication process whereby rigid layer 220F is used for casting the elastomeric material (e.g., polyurea) 210F, and doing so with a required thickness of the elastomeric material 210F. The elastomeric material 210F can be cast from inside through-holes provided in each floorboard 28 of vehicle 10.

The bottom plate 220C covers at least a portion of central region 30. Plate 220C (e.g., made of aluminum) is coated with elastomeric material 210C, thus forming a two-layer construction 200C that is positioned in the center of inventively enhanced vehicle 100. Some inventive embodiments provide for a rigid plate 220 that is atachable and detachable, the removability of plate 220 thus facilitating access (e.g., for maintenance or repair) to interior parts of vehicle 100. At least two mechanisms are manifest in association with plate 220C. According to a first mechanism, plate 220C protects by deflecting the blast or impact toward the ground 99. According to a second mechanism, plate 220C favorably alters the major undercarriage 14 frame vibration modes by providing nonlinear damping. The bottom plate 220C converts the longitudinal frames to a box section with high vertical, lateral stiffness, as well as torsional stiffness, in addition to the large damping provided by the ERC 210C. This significantly reduces the lateral and vertical accelerations of the vehicle during the explosion, and thus reduces the risk of injury. The elastomer 210C interacts with the blast by generating internal shock waves, thereby reducing the negative effect of plate 220C, especially in terms of preventing or decreasing fracture and localization of plate 220C.

As shown in FIG. 5 through FIG. 9, the bottom surface of the elastomeric coating 210C of plate 220C is lower (nearer to ground 99) than is the bottom surface of each sheet metal 220F member. This illustrates not only that plate 220C is thicker than each sheet metal 220F, but also that the upper surface of elastomer 210F is higher (further from ground 99) than is the upper surface of plate 220C. For illustrative purposes, the upper surface of elastomer 210F is shown to be disposed above the bottom fender line in vehicle 10. Further, the lower surface of elastomer 210F, the upper surface of sheet 210F, and the upper surface of plate 210C are shown to be approximately coincident.

Testing conducted by the United States Navy in association with an HMMWV 10 demonstrated the efficacy of the present invention. The subject HMMWV 10, similar to that shown in FIG. 1 through FIG. 4, was about 190 inches (3.30 meters) in length, 86 inches (2.18 meters) in width, and 72 inches (1.83 meters) in height. The test vehicle 10 was largely constructed of aluminum, including in the wheel well 18 and floor board 28 regions. The ERC material 210 selected for this investigation was an "80 Shore A" castable polyurea.

In the process of converting this test vehicle 10 to an inventively enhanced vehicle 100, a flat eighteen-gage (0.050 inch) steel sheet metal 220F was used as a mold under each aluminum floorboard 28 for casting ERC 210F under the floorboard 28, beneath the corresponding passenger compartment. In each of the aluminum wheel wells 18, a one-quarter inch flat mild steel 220W was used as the mold material for casting ERC 210W. In both the wheel well 18 and floorboard 28 locations, the rigid mold 220 was attached to allow for a three-quarter inch gap between rigid mold 220 and the vehicular surface, and this gap was then filled with the ERC material 210; that is, a three-quarter inch gap was provided between each combination of a rigid mold 220W and a wheel well 18, and a three-quarter inch gap was provided between each combination of a rigid mold 220F and a floorboard 28. Between the floorboard frames 28L and 28R and under the center of the vehicle 10, a separate laminar construction 200, viz., laminar construction 200C (including an aluminum plate 220C and an ERC 210C facing thereon) was associated with vehicle 10 so that the bottom surface of ERC 210C was distanced about 16 inches (0.41 meters) from the ground 99.

Figure 11:
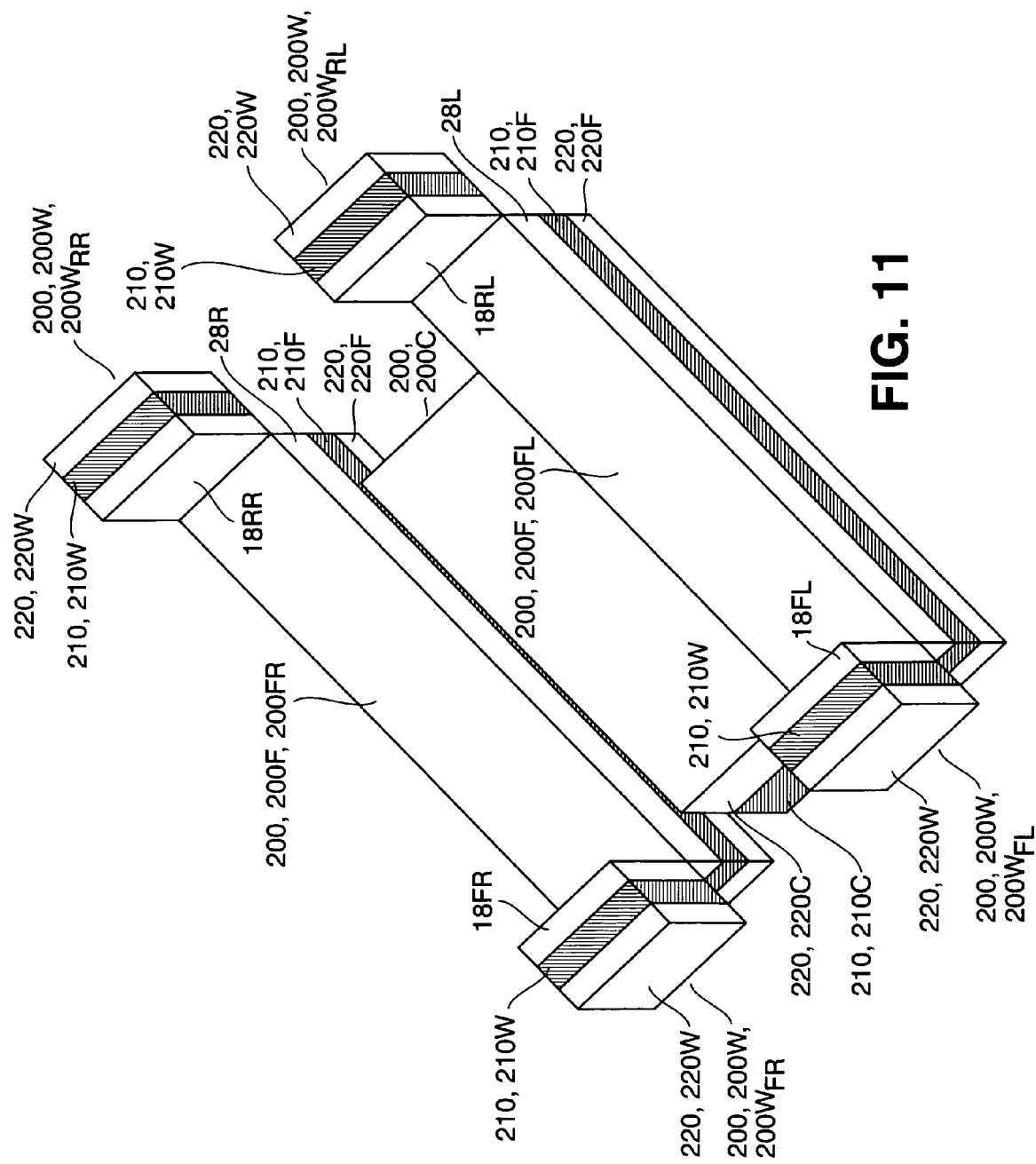
FIG. 11 is an upper perspective diagrammatic view of an embodiment of an overall protective system in accordance with the present invention similar to that shown in FIG. 5 through FIG. 10, particularly illustrating how the seven subsystems form the overall protective system in an enclosure-like configuration with respect to the cabin.

As shown in FIG. 11, the present invention's seven individual material systems 200—namely, three-layer wheel well system $200W_{FL}$, three-layer wheel well system $200W_{FR}$, three-layer wheel well system $200W_{RL}$, three-layer wheel well system $200W_{RR}$, three-layer floorboard system 200FL, three-layer floorboard system 200FR, and two-layer central underside system 200C—collectively describe a kind of protective enclosure for cabin 14 that shields the cabin occupants from serious harm. Otherwise expressed, the present invention's cumulative protective "system" is shown to include seven "sub-systems" 200. According to generally preferred inventive practice, the overall protective arrangement includes seven systems 200 similarly as shown in FIG. 11. The seven systems (or sub-systems) 200 collectively form, for cabin 14, a buffer unit or shield unit generally describing a shape that can variously but equivalently described as that of a "half-shell," "dish" or "boat hull."

Three-layer floorboard system 200FL, three-layer floorboard system 200FR, and two-layer central underside system 200C are next to each other, the combination thereof approximately defining a horizontal geometric plane h. Each three-layer wheel well system 200W is contiguous to its corresponding three-layer floorboard system 200F. According to typical inventive practice, each wheel well system 200W is disposed at an angle θ (shown in FIG. 5) that is in the range between forty-five degrees and ninety degrees (i.e., verticality of wheel well system 200W) with respect to the horizontal geometric plane h defined by underside systems $200F_{FL}$, $200F_{FR}$ and 200C. That is, each wheel well system 200W is disposed at an angle (90−θ)° that is in the range between 45° and 0° (i.e., verticality of wheel well system 200W) with respect to a vertical geometric plane that passes through the junction between wheel well system 200W and its corresponding floorboard system 200F.

According to typical inventive practice, the width of each material system 200 is commensurate (or approximately so) with the width of the vehicle component or region covered by such material system. As illustrated in FIG. 8 through FIG. 11, wheel wells 18 and their adjoining floorboards 28 are approximately equal in width (width being a dimension directed laterally across vehicle 10, between the vehicle's left and right sides). This widthwise equivalence is a design feature of a typical HMMWV. Thus, as shown in FIG. 11, wheel well systems $200W_{FL}$ and $200W_{RL}$ are each approximately coextensive with floorboard system 200FL, and wheel well systems $200W_{FR}$ and $200W_{RR}$ are each approximately coextensive with floorboard system 200FR. Many vehicular makes and models are characterized by narrower wheel well widths than floorboard widths. Inventive practice is effectual regardless of the relative widths of the wheel wells and floorboards.

Some inventive embodiments represent variations on the inventive theme depicted in FIG. 11. If the applicative context permits, significant protection to the vehicle occupants, albeit usually at a reduced level, can be inventively afforded when one or more of the seven regions of interest (front left wheel well 18FL; front right wheel well 18FR; rear left wheel well 18RL; rear right wheel well 18RR; left floorboard region 28L of cabin underside 26; right floorboard region 28R of cabin underside 26; central region 30 of cabin underside 26) has associated therewith either no system 200 or a modified version thereof. In this regard, for instance, a diminished but perhaps still worthwhile degree of protection can be obtained when ERC material 210 alone is applied, in the absence of non-elastomeric (rigid) material 200, to one or more wheel wells 18 or to either or both floorboard regions 28.

Moreover, ERC 210 can be applied to either or both sides of a vehicular wall so that a material system 200 is established at either or both sides of the vehicular wall. For instance, in the front left wheel well 18FL or front right wheel well 18FR region, a material system 200W can be provided wherein ERC layer 210 is applied to the back side (rather than or in addition to the front side) of wheel well 18FL or 18FR so that the rigid material layer 220 is facing toward the rear (rather than or in addition to the front) of vehicle 10. Similarly, a material system 200W can be provided wherein ERC layer 210 is applied to the frontward side (rather than or in addition to the rearward side) of wheel well 18RL or 18RR so that the rigid material layer 220 is facing toward the front (rather than or in addition to the rear) of vehicle 10. Further, a material system 200F can be provided wherein ERC layer 210 is applied to the upper side (rather than the lower side) of floorboard 28L or 28R so that the rigid material layer 220 is facing upward (rather than downward).

Generally speaking, inventive practice admits of wide variations in terms of materials, configurations, and installation techniques. ERC material 210 can be any elastomer, natural or polymeric, such as polyurea, polyurethane, or rubber. ERC material 210 can be applied by casting it in place, or by spraying it, or by bonding it as a whole, individual piece. Rigid material 220 can be any non-elastomeric material having the requisite stiffness, such as a metal or composite. Rigid material 220 can be characterized by any thickness. ERC material 210 can be characterized by any thickness.

The example described herein with reference to the figures illustrates inventive practice for purposes of HMMWV protection; nevertheless, the present invention admits of practice in association with wheeled vehicles of diverse designs, including automobiles, buses, trucks, sports utility vehicles, limousines, etc. For instance, inventive principles are applicable not only to four-wheeled passenger vehicles but also passenger vehicles having more than four wheels (e.g., six-wheeled or eight-wheeled passenger vehicles). Generally, regardless of the number of pairs of axial wheels, the two longitudinally extreme (i.e., front-most and rear-most) pairs of wheel wells are treated as inventive practice will typically dictate for a four-wheeled passenger vehicle, and the intermediate pair or pairs of wheel are treated similarly.

For instance, a vehicle may have an even number greater than two (e.g., four, six, etc.) of longitudinally uniformly spaced pairs of axial wheels; according to some such inventive embodiments, the wheel wells in the longitudinal front half of the vehicle are treated as if they are the front wheel wells of a four-wheeled vehicle, while the wheel wells in the longitudinal rear half of the vehicle are treated as if they are the rear wheel wells of a four-wheeled vehicle. As another example, a vehicle may have an odd number greater than one (e.g., three, five, etc.) of longitudinally uniformly spaced pairs of axial wheels; according to some such inventive embodiments, each of the longitudinally intermediate (neither front nor rear) pair of wheel wells is covered in two areas that face each other, as if they are at once both front wheel wells and rear wheel wells.

The present invention is not to be limited by the embodiments described or illustrated herein, which are given by way of example and not of limitation. Other embodiments of the present invention will be apparent to those skilled in the art from a consideration of this disclosure or from practice of the present invention disclosed herein. Various omissions, modifications and changes to the principles disclosed herein may be made by one skilled in the art without departing from the true scope and spirit of the present invention, which is indicated by the following claims.

What is claimed is:

1. A method for augmenting a wheeled vehicle in order to enhance its occupant protection capability, said vehicle including a cabin and an undercarriage, said undercarriage including an undercarriage portion situated beneath said cabin, said undercarriage portion including a pair of floorboard portions and a central portion intermediate said floorboard portions, each said floorboard portion being at least substantially characterized by structural continuity, said central portion being at least substantially characterized by structural discontinuity, said method comprising:

covering each said floorboard portion with a floorboard-location elastomeric layer and a floorboard-location non-elastomeric layer so that said floorboard-location elastomeric layer is interposed between said floorboard portion and said floorboard-location non-elastomeric layer, wherein with respect to each said floorboard portion the combination including said floorboard portion and its associated said floorboard-location elastomeric layer and its associated said floorboard-location non-elastomeric layer essentially represents a floorboard-location three-layer material system, said floorboard portion and said floorboard-location non-elastomeric layer each being more rigid than said floorboard-location elastomeric layer; and covering said central portion with a central-location elastomeric layer and a central-location non-elastomeric layer so that said central-location non-elastomeric layer is interposed between said central portion and said central-location elastomeric layer, wherein with respect to said central portion the combination including its associated said central-location elastomeric layer and its associated said central-location non-elastomeric layer essentially represents a central-location two-layer material system, said central-location non-elastomeric layer being more rigid than said central-location elastomeric layer.

2. The method of claim 1, wherein each said floorboard-location three-layer material system effects at least one dissipative mechanism in response to an impacting event, said at least one dissipative mechanism including constrained layer damping.

3. The method of claim 1, wherein said central-location elastomeric layer faces downward, and wherein said central-location two-layer material system effects deflection in response to an impacting event.

4. The method of claim 1, said vehicle further including two pairs of axial wheels and two pairs of non-horizontal wheel wells, each said wheel well being associated with a said wheel, each said wheel well being at least substantially characterized by structural continuity, said method further comprising covering each said wheel well with a well-location elastomeric layer and a well-location non-elastomeric layer so that said well-location elastomeric layer is interposed between said wheel well and said well-location non-elastomeric layer, wherein with respect to each said wheel well the combination of said wheel well and its associated said well-location elastomeric layer and its associated said well-location non-elastomeric layer represents a well-location three-layer material system, said wheel well and said well-location non-elastomeric layer each being more rigid than said well-location elastomeric layer.

5. The method of claim 4, wherein:
each said floorboard-location three-layer material system and each said well-location three-layer material system effects at least one dissipative mechanism in response to an impacting event, said at least one dissipative mechanism including constrained layer damping; and
said central-location two-layer material system effects deflection in response to the impacting event.

6. The method of claim 4, wherein each said floorboard-location non-elastomeric layer, each said well-location non-elastomeric layer, and each said central-location non-elastomeric layer is at least substantially composed of a material selected from the group consisting of metal and composite.

7. The method of claim 4, wherein a generally integral protective shield is described by the combination including:
both of said floorboard-location three-layer material systems;
said central-location two-layer material system; and
all four of said well-location three-layer material systems.

8. The method of claim 7, wherein:
each said floorboard-location three-layer material system and each said well-location three-layer material system effects at least one dissipative mechanism in response to an impacting event, said at least one dissipative mechanism including constrained layer damping; and
said central-location two-layer material system effects deflection in response to the impacting event.

9. The method of claim 7, wherein each said floorboard-location non-elastomeric layer, each said well-location non-elastomeric layer, and each said central-location non-elastomeric layer is at least substantially composed of a material selected from the group consisting of metal and composite.

10. The method of claim 9, wherein:
each said floorboard-location three-layer material system and each said well-location three-layer material system effects at least one dissipative mechanism in response to an impacting event, said at least one dissipative mechanism including constrained layer damping; and
said central-location two-layer material system effects deflection in response to the impacting event.

11. The method of claim 4, wherein each said floorboard-location three-layer material system and each said well-location three-layer material system effects at least one dissipative mechanism in response to an impacting event, said at least one dissipative mechanism including constrained layer damping.

12. A method for rendering a vehicular cabin assembly more occupant-protective, said cabin assembly including a cabin body, four wheel-facing bulkheads and two floorboards separated by a space therebetween, each said bulkhead adjoining a said floorboard, said method comprising providing shielding means for said cabin body, said providing shielding means including:
at each said bulkhead, establishing a first sandwich construction that includes said bulkhead, first elastomeric material, and first non-elastomeric material, wherein said first elastomeric material is sandwiched between said bulkhead and said first non-elastomeric material;
at each said floorboard, establishing a second sandwich construction that includes said floorboard, second elastomeric material, and second non-elastomeric material, wherein said second elastomeric material is sandwiched between said floorboard and said second non-elastomeric material; and
at least substantially covering said space between said floorboards, said at least substantially covering including attaching to said cabin assembly a double-layer construction that includes third elastomeric material and third non-elastomeric material, wherein said third elastomeric material is underneath said third non-elastomeric material.

13. The method of claim 12, wherein said shielding means includes the integration of:
said first sandwich constructions at said bulkheads;
said second sandwich constructions at said floorboards; and
said double-layer construction attached to said cabin assembly.

14. The method of claim 13, wherein said shielding means is both dissipative and deflective with respect to forceful influence exerted upon said cabin assembly.

15. An occupant-protective understructure suitable for incorporation as part of a wheeled vehicle, said wheeled vehicle having a front vehicle end, a rear vehicle end, a left vehicle side, and a right vehicle side, said understructure comprising:
two separated, at least approximately coplanar floor components, said two floor components being a left floor component and a right floor component, said left floor component having a left floor component front end and a left floor component rear end, said right floor component having a right floor component front end and a right floor component rear end, each said floor component including two rigid layers and an elastomeric layer sandwiched therebetween;
four wheel bulkhead components each for placement proximate a wheel of said vehicle, said four wheel bulkhead components being a left front wheel bulkhead component, a right front wheel bulkhead component, a left rear wheel bulkhead component, and a right rear wheel bulkhead component, each said wheel bulkhead component including two rigid layers and an elastomeric layer sandwiched therebetween, said left front wheel bulkhead component adjoining said left floor component at said left floor component front end, said right front wheel bulkhead component adjoining said right floor component at said right floor component front end, said left rear wheel bulkhead component adjoining said left floor component at said left floor component rear end, said right rear wheel bulkhead component adjoining said right floor component at said right floor component rear end, each said wheel bulkhead component being disposed at an angle with respect to the adjoining said floor component; and a middle component including a rigid layer and an elastomeric layer on the underside of said rigid layer, said middle component being interposed between said two floor components so as to be at least nearly coplanar with said two floor components.

16. The understructure of claim 15, said vehicle being adaptable to carrying at least one occupant, wherein in response to forceful influence exerted upon said vehicle, said four wheel bulkhead components, said two floor components and said middle component aggregately shield said at least one occupant.

17. The method of claim 16, wherein said aggregate shielding includes both dissipation and deflection with respect to said forceful influence.

18. A wheeled vehicle attributed with occupant protectiveness against injurious force encountered by said vehicle, said vehicle comprising a cabin body, a cabin underside, two pairs of axial wheels, and two pairs of wheel well areas, said cabin underside including two side floorboard areas and a non-floorboard area intermediate said floorboard areas, each said wheel well area being associated with a said wheel, said floorboard areas and said wheel well areas each being characterized by a laminar configuration including two rigid layers and an elastomeric layer therebetween, said non-floorboard area being characterized by a laminar configuration including a rigid layer and an elastomeric layer in which said elastomeric layer faces downward.

19. The vehicle of claim 18 wherein said floorboard areas, said non-floorboard area and said wheel well areas collectively form a buffer for said cabin, said buffer generally describing a dish shape.

20. The vehicle of claim 13, said vehicle having a front end and a rear end, wherein each said floorboard area adjoins a front said wheel well area and a rear said wheel well area so as to generally describe a bracket shape, and wherein said non-floorboard area adjoins said floorboard areas so as to generally describe a planar shape.

21. The vehicle of claim 20 wherein, in response to injurious force encountered by said vehicle, said buffer acts to deflect the impact and to dissipate the energy that are associated with said injurious force.

22. The vehicle of claim 21 wherein each said rigid layer at least substantially consists of a material selected from the group consisting of metal and composite.

23. The vehicle of claim 13 wherein, in response to injurious force encountered by said vehicle, said buffer acts to deflect the impact and to dissipate the energy that are associated with said injurious force.

24. The vehicle of claim 13 wherein each said rigid layer at least substantially consists of a material selected from the group consisting of metal and composite.

25. The vehicle of claim 24 wherein, in response to injurious force encountered by said vehicle, said buffer acts to deflect the impact and to dissipate the energy that are associated with said injurious force.

* * * * *